United States Patent
Hollenberg

(10) Patent No.: US 9,285,258 B2
(45) Date of Patent: Mar. 15, 2016

(54) HOUSING ARRANGEMENT FOR A FLOW METER

(71) Applicant: KROHNE Messtechnik GmbH, Duisburg (DE)

(72) Inventor: Holger Hollenberg, Duisburg (DE)

(73) Assignee: KROHNE Messtechnik GmbH, Duisburg (DE)

( * ) Notice: Subject to any disclaimer, the term of this patent is extended or adjusted under 35 U.S.C. 154(b) by 335 days.

(21) Appl. No.: 13/751,658

(22) Filed: Jan. 28, 2013

(65) Prior Publication Data

US 2014/0109665 A1    Apr. 24, 2014

(30) Foreign Application Priority Data

Oct. 18, 2012   (DE) .......................... 10 2012 020 382

(51) Int. Cl.
*G01F 15/14*   (2006.01)
*G01F 15/06*   (2006.01)
*G01D 4/00*    (2006.01)

(52) U.S. Cl.
CPC .............. *G01F 15/14* (2013.01); *G01F 15/068* (2013.01); *G01D 4/00* (2013.01)

(58) Field of Classification Search
CPC ............ G01F 15/14; G01F 3/12; G01F 15/18
USPC ............................................. 73/273; 455/572
See application file for complete search history.

(56) References Cited

U.S. PATENT DOCUMENTS

| | | | |
|---|---|---|---|
| 5,721,383 A | | 2/1998 | Franklin et al. |
| 6,094,540 A | * | 7/2000 | Kikuchi .................... 396/304 |
| 6,894,659 B2 | | 5/2005 | Pepperling et al. |
| 8,069,720 B2 | | 12/2011 | Isenmann et al. |
| 2005/0245291 A1 | * | 11/2005 | Brown et al. ................. 455/572 |
| 2010/0257930 A1 | * | 10/2010 | Isenmann et al. .............. 73/273 |

FOREIGN PATENT DOCUMENTS

| | | | |
|---|---|---|---|
| CN | 201663623 U | * | 10/2010 |
| DE | 10 2009 028 044 A1 | | 2/2011 |
| DE | 102010034659 A1 | * | 2/2012 |

\* cited by examiner

*Primary Examiner* — Harshad R Patel
*Assistant Examiner* — Nathaniel T Woodward
(74) *Attorney, Agent, or Firm* — Roberts Mlotkowski Safran & Cole, PC; David S. Safran

(57) ABSTRACT

A housing arrangement for a flow meter that has at least one housing (2) and at least one display device (3) which is located on the housing (2). The maintenance effort for the flow meter is reduced by there being at least one photovoltaic cell on the housing in a manner configured and arranged surrounding the at least one display device.

12 Claims, 4 Drawing Sheets

HOUSING ARRANGEMENT FOR A FLOW METER

BACKGROUND OF THE INVENTION

1. Field of the Invention

Figure 1:
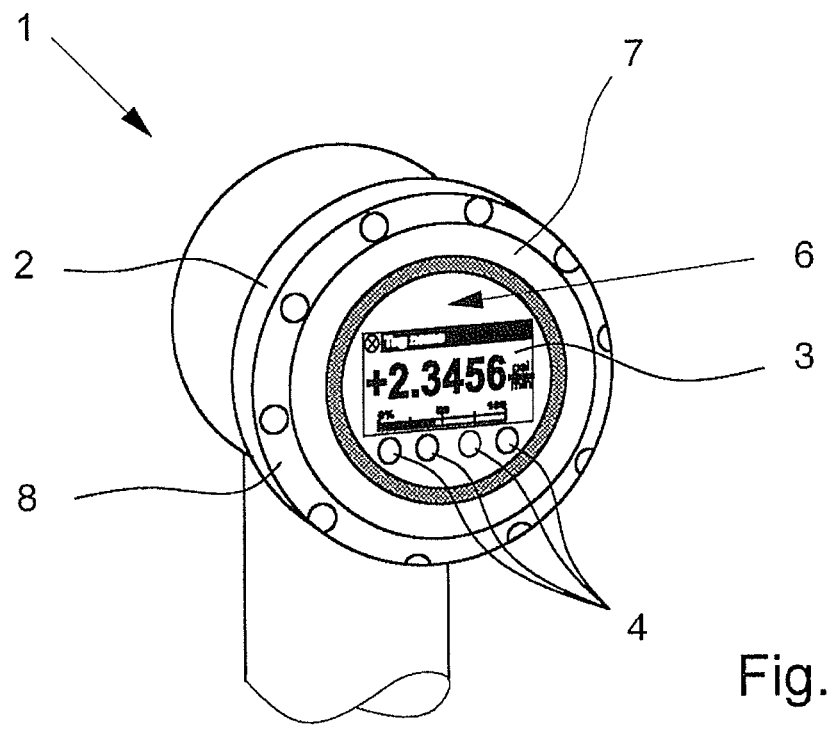

The invention relates to a housing arrangement for a flow meter, with at least one housing and at least one display device which is located on the housing. Furthermore, the invention relates to a flow meter with a housing arrangement.

2. Description of Related Art

Housing arrangements for meters, especially for flow meters, are known in the prior art in a plurality of configurations. Conventionally, housing arrangements with a housing are used to accommodate at least one part of the electronics of the meters which comprise, for example, components for acquiring, evaluating and displaying measured values. A housing arrangement is preferably located on a segment of a measuring tube of a flow meter and is connected to it.

In a plurality of meters, on the housing of a housing arrangement, there is also a display device which displays the operating parameters and/or the measured values of the respective meter, for a flow meter, for example, the current flow rate or the temperature of the medium is displayed. Furthermore, the meter can be configured, for example, using a display device in the form of a touchscreen. Alternatively, for example, operator controls are provided with which parameters of the meter can be interrogated or influenced.

In self-contained flow meters which have an independent internal structure and which transfer their measurement results preferably via a wireless interface to a central location, a power supply is often accommodated within the housing of the housing arrangement, for example, in the form of a battery or rechargeable battery. In any case, known flow meters with an internal energy source have the disadvantage that the service life of the battery is very limited due to the occasionally high power demand, as a result of which the maintenance cost for the flow meter is increased by need for regular replacement of the batteries.

U.S. Pat. No. 5,721,383 discloses a flowmeter system having a flow meter and wireless transmitter and a photo voltaic battery cell that is coupled to a counter and the transmitter by conductors. The use of the photo voltaic battery cell is intended to reduce the maintenance required for continued operation of the flow meter system as the cell can be maintained in a charged state sufficient to operate the flow meter system by being exposed periodically to ambient light. However, there is no particular disclosure relative to the location of the photo voltaic battery cell so provide an optimally compact arrangement.

SUMMARY OF THE INVENTION

Proceeding from the aforementioned prior art, therefore, a primary object of the present invention is to reduce flow meter maintenance costs.

First of all, the aforementioned object is achieved in a generic housing arrangement essentially in that there is at least one photovoltaic cell on the housing. The photovoltaic cell—solar cell—, due to the direct arrangement on the housing of the housing arrangement, can be easily connected to the electronics of the meter and/or the control electronics present in the housing. The photovoltaic cell and the housing are made as a unit so that the photovoltaic cell for example, forms a part of the housing or overlaps a part of the surface of the housing.

The voltage which is generated by the photovoltaic cell when light is incident, for example, is used to operate the meter and/or to operate individual components of the flow meter, for example, the evaluation electronics. The voltage of the photovoltaic cell can on the one hand be supplied directly, on the other hand it can be first temporarily stored in an energy storage device, for example, in a rechargeable battery or in an capacitor. When light is incident, the battery is always charged by the photovoltaic cell, as a result of which the service life of the battery is increased and the maintenance intervals for replacing the battery are prolonged.

The photovoltaic cell is located on the housing or integrated directly into the housing, for example, in a recess. Preferably the housing to which the photovoltaic cell is attached is arranged to be able to turn in the housing arrangement or on the meter so that the housing with the photovoltaic cell attached to it can be aligned with little effort depending on the incident light direction.

Preferably, the photovoltaic cell is located on the housing in one plane with the display device which is made for example, as a display. But there is also an arrangement of the display device and the photovoltaic cell in different planes. The plane of the display device is recommended because the display device is conventionally located in an exposed location on the flow meter; this benefits the incident radiation on the photovoltaic cell. Especially preferably the photovoltaic cell is made flexible so that it conforms to the surface contour of the housing and in this way it can be attached flat to the housing.

According to a first configuration, it has been found to be especially advantageous if the photovoltaic cell is made and arranged such that the photovoltaic cell surrounds the display device. The photovoltaic cell is consequently made as a shape with surrounds the display device, i.e. that seen in the direction of viewing aligned orthogonally to the display device the photovoltaic cell surrounds the display device with a closed shape. The shape of the outer contour of the photovoltaic cell is for example, rectangular, square, round or even oval. The display device and the photovoltaic cell are either in one plane or in different planes.

Another exemplary embodiment is characterized in that the photovoltaic cell has a recess which corresponds at least to the size of the display device. Preferably the size of the recess corresponds exactly to the size of the display device so that the display device is completely surrounded by the photovoltaic cell, consequently the display device is located within the photovoltaic cell. The photovoltaic cell borders the display device which is made for example, as a display. In this way the size of the photovoltaic cell can be maximized while the display device remains easy to read. This configuration optimally uses the surfaces present on the housing of a housing arrangement, specifically on the one hand for energy conversion, on the other for display of information.

Preferably the photovoltaic cell is fitted into a contour dictated by the housing so that according to another configuration it is especially preferably provided that the photovoltaic cell is made annular. The photovoltaic cell is made as a circular ring which surrounds the display device, for example, a display. Here it is provided on the one hand that the circular solar cell is located in one plane with the display device, but on the other hand also that the display device and the photovoltaic cell are located in different planes so that the photovoltaic cell optically surrounds the display device in the direction of looking at the display device. The annular photovoltaic cell can be advantageously integrated into a housing of a housing arrangement with a likewise circular basic shape.

In order to increase the efficiency of the photovoltaic cell, according to another configuration it is provided that at least the photovoltaic cell is mounted to be able to swivel around at least one axis, especially that at least the photovoltaic cell is mounted to be able to swivel around at least two axes. The photovoltaic cell is consequently attached to the housing of the housing arrangement such that it can be tilted around at least one axis, i.e. the tilt of the photovoltaic cell can be re-set relative to the housing or relative to the display device. Thus, for example, in a circular annular photovoltaic cell it is provided that it can be tilted for example, along at least one axis which coincides with the diameter. But it is also provided that the tilting takes place for example, along one tangent which adjoins a photovoltaic cell. Furthermore there is also a tilt over one axis which corresponds to any secant on a circular photovoltaic cell. Especially preferably the photovoltaic cell is mounted to be able to swivel around at least two axes so that any tilt in a plurality of directions can be set, as a result of which the photovoltaic cell can be easily aligned on one incidence direction, for example, of solar radiation.

According to another configuration which has been found to be advantageous especially with a photovoltaic cell which is mounted to be able to swivel around one axis, it is provided that at least the photovoltaic cell is pivotally mounted with reference to the plane of its extension. The photovoltaic cell is conventionally made flat and extends in one plane. Due to the pivotal mounting of the photovoltaic cell in combination with the tilting capacity around at least one axis, as in a tilt around two axes a tilt of the photovoltaic cell in a plurality of directions of space can be implemented, as a result of which the photovoltaic cell can be flexibly adjusted to changing light incidence or to individually locally dependent light incidence. The alignment of the photovoltaic cell is preferably adjusted manually by the photovoltaic cell being aligned by a user.

In order to simplify the alignment of the photovoltaic cell, according to another configuration it is provided that the photovoltaic cell is mounted to be able to move with at least one servo. The photovoltaic cell is automatically aligned on one incidence direction, for example, by a control device which enables the photovoltaic cell to track the altitude of the sun. Alternatively there is also alignment which is dependent on time. The alignment of the photovoltaic cell takes place however preferably via a light sensor which delivers the signals in order to adapt the photovoltaic cell according to the incidence circumstances which are given individually at the mounting site. The alignment takes place by tilting and/or turning the photovoltaic cell by at least one servo. If necessary there is also re-positioning via gearing.

The replacement and positioning of the photovoltaic cell can be simplified according to another configuration in that on the housing there is at least one cover ring and that the photovoltaic cell is located in the cover ring. The cover ring is used for example, to attach a transparent covering which is made especially as a display glass. The cover ring is preferably screwed onto the housing arrangement, especially onto the housing, or is attached with a plurality of screws. The cover ring also annularly surrounds the display device as seen from the viewing direction of the display device.

Because the photovoltaic cell is located in the cover ring, it can be easily replaced by replacing the cover ring. Furthermore, due to the arrangement in the cover ring it is located somewhat above the display device so that there is advantageous radiation incidence on the photovoltaic cell. In order to align the photovoltaic cell the cover ring is also mounted to be able to turn and/or to be tilted.

The interchangeability and alignment capacity of the photovoltaic cell can be easily improved according to another configuration in that on the housing there is at least one cover flap which overlaps the display device, and that the photovoltaic cell is located in the cover flap. The cover flap is preferably arranged such that it overlaps the display device, especially also overlaps an existing display glass. The large area of the cover flap is provided with a photovoltaic cell so that the surface of the photovoltaic cell is maximized.

The cover flap is mounted to be able to swivel preferably around one axis, especially preferably around at least two axes, for example, with a ball-and-socket joint or pivot bearing so that the photovoltaic cell with the cover flap can be aligned in any optional direction to the radiation incidence direction. In addition to holding the photovoltaic cell, the cover flap is used to protect the display device and the display glass which may be present.

In particular, according to a last configuration the alignment of the photovoltaic cell is simplified in that the opening state, especially the opening angle and the tilt, of the cover flap, can be fixed. The cover flap is consequently mounted especially such that if the cover flap is opened by a user, the cover flap remains in this position which has been fixed by the user and the photovoltaic cell is thus aligned. The cover flap is consequently rigidly mounted such that manual movement of the cover flap is possible, but the cover flap does not move by itself due to gravity.

Preferably the housing arrangement is located on a flow meter, especially a coriolis mass flow meter, the voltage generated by the photovoltaic cell being used at least in part for operating the flow meter.

In particular, there is now a host of possibilities for embodying and developing the housing arrangement according to the invention. In this regard reference is made the following description of preferred exemplary embodiments in conjunction with the drawings.

BRIEF DESCRIPTION OF RELATED ART

Figure 2:
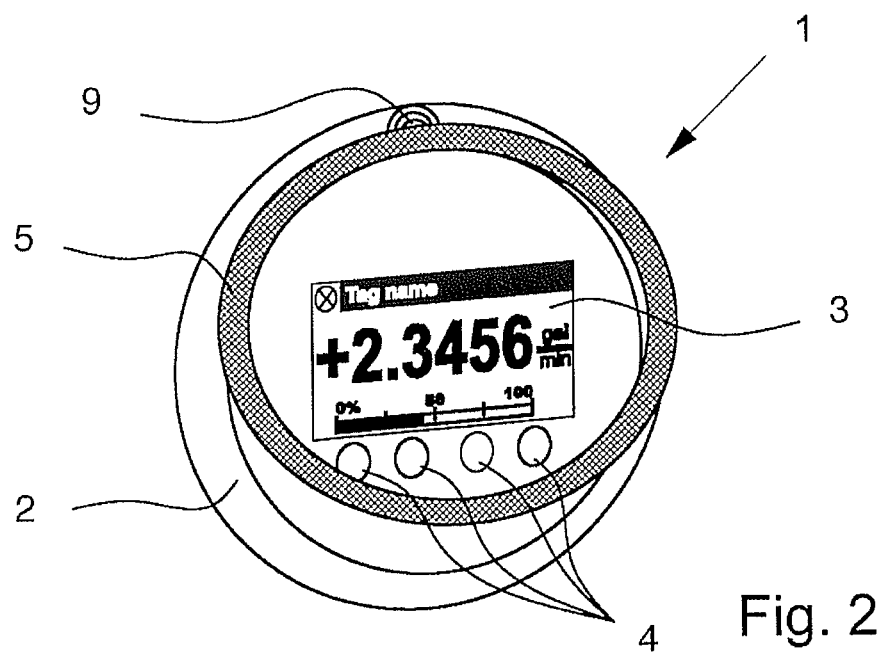
Figure 3:
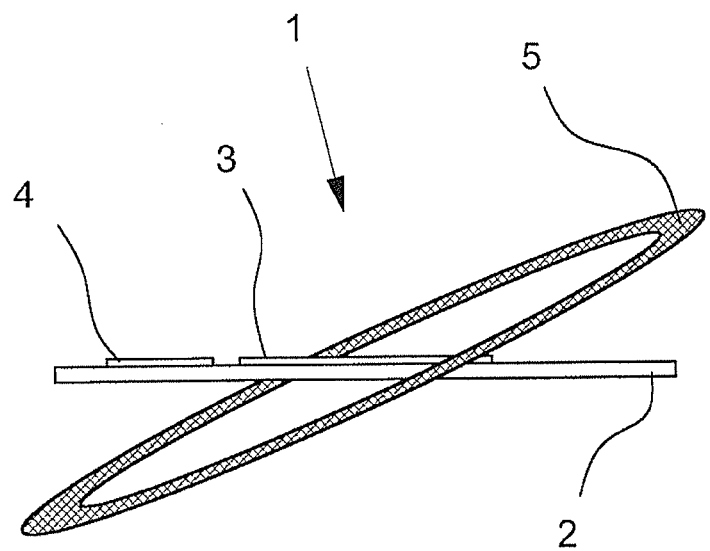
Figure 4:
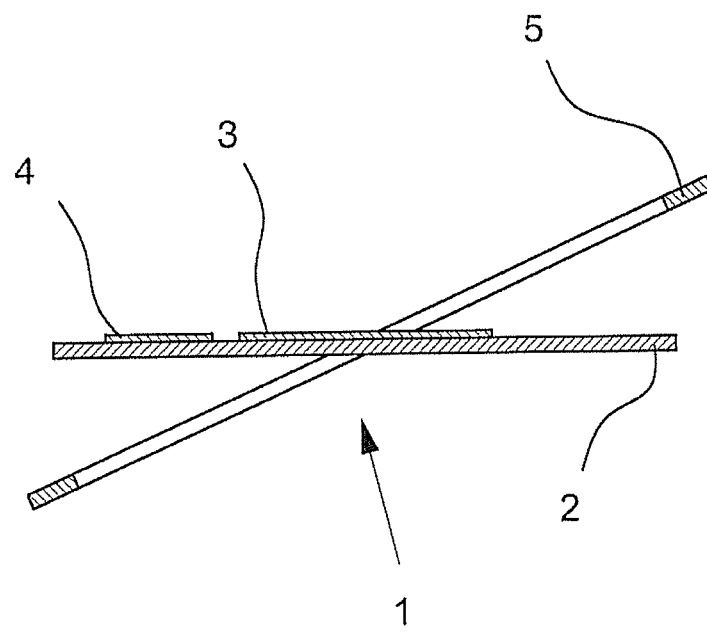
Figure 5:
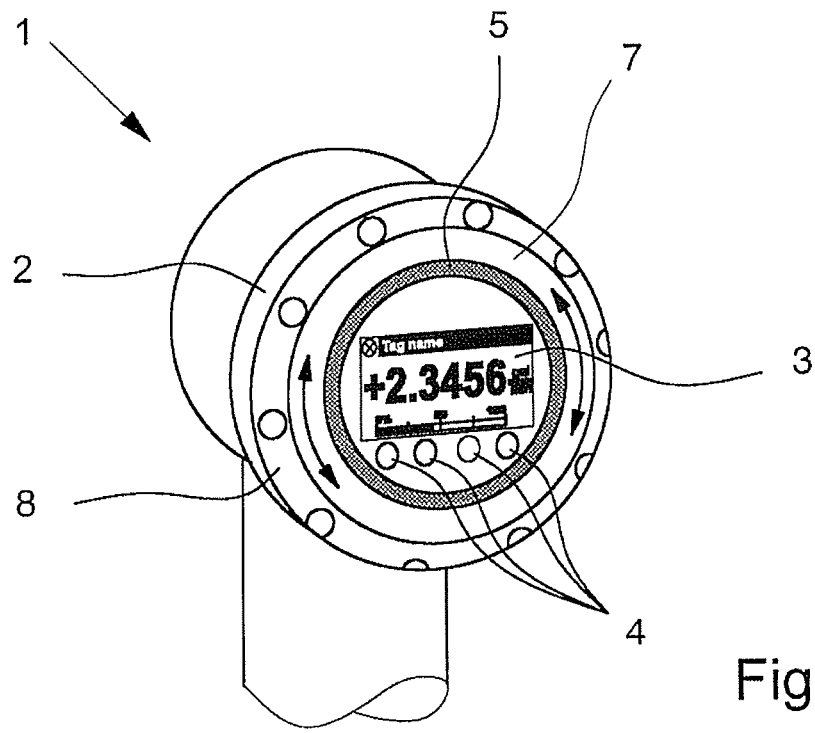
Figure 6:
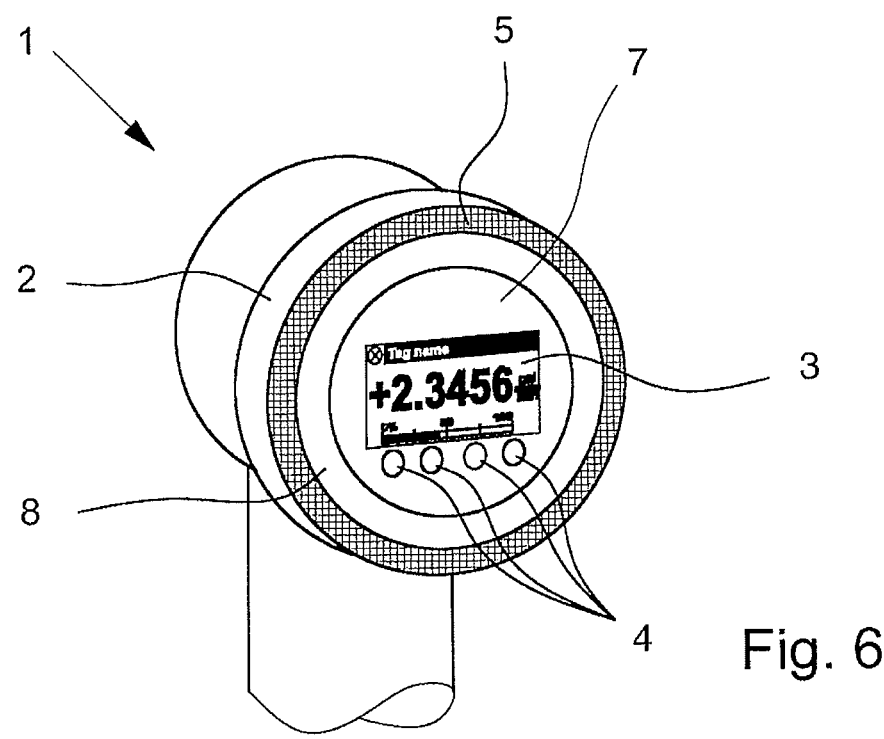
Figure 7A:
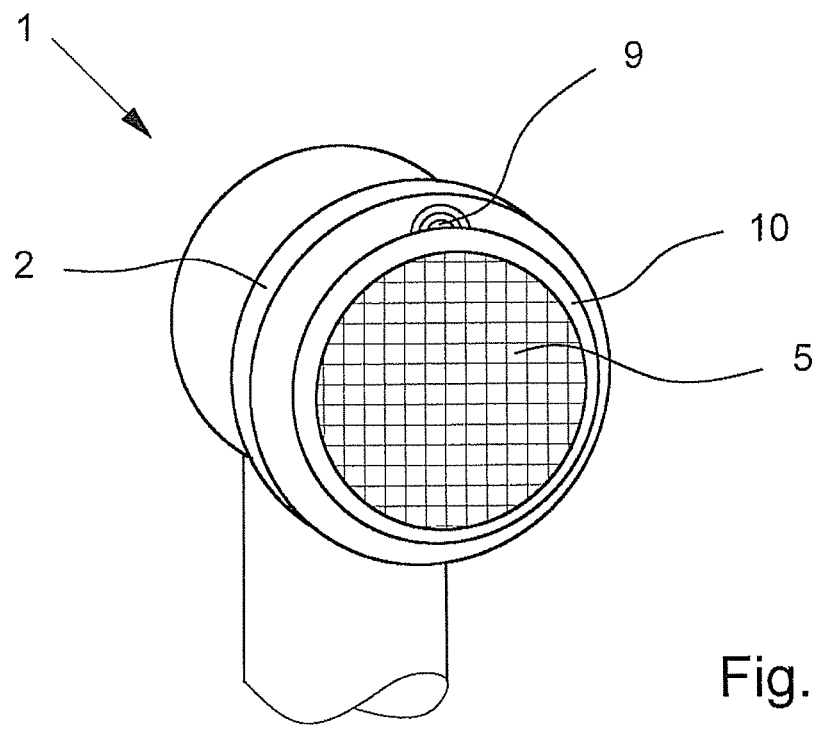
Figure 7B:
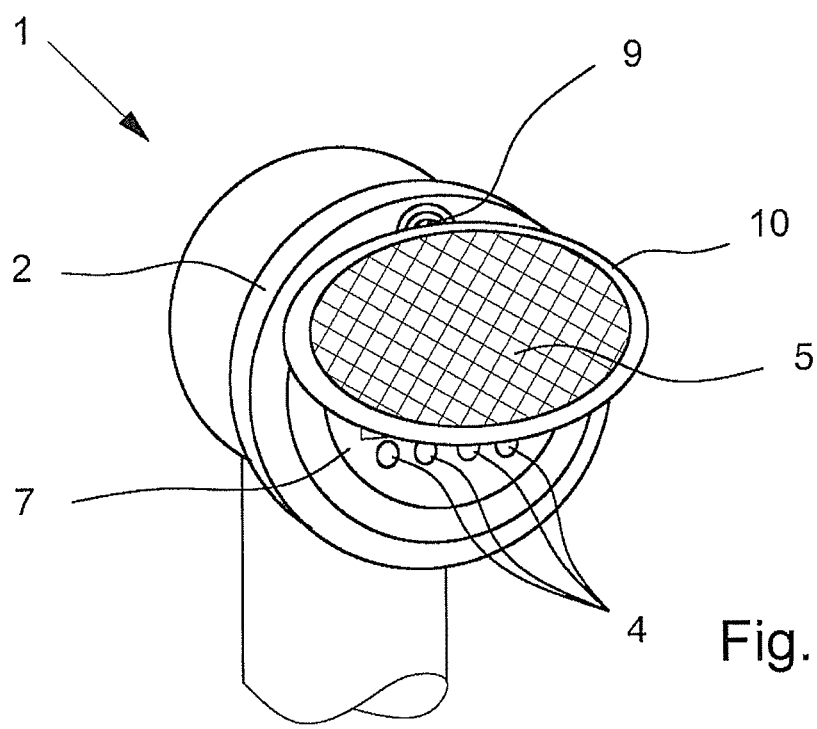

FIG. 1 shows one exemplary embodiment of a housing arrangement in a perspective view, FIG. 2 shows one exemplary embodiment of a part of a housing arrangement in a perspective view, FIG. 3 shows one exemplary embodiment of a part of a housing arrangement in a perspective view, FIG. 4 shows another exemplary embodiment of a part of a housing arrangement in a perspective view, FIG. 5 shows one exemplary embodiment of a housing arrangement in a perspective view, FIG. 6 shows one exemplary embodiment of a housing arrangement in a perspective view, and FIG. 7a, 7b show one exemplary embodiment of a housing arrangement with a cover flap.

DETAILED DESCRIPTION OF THE INVENTION

FIG. 1 shows a housing arrangement 1 with a housing 2 and a display device 3 which is located on the housing. In this exemplary embodiment underneath the display device 3 are operator buttons 4. The display device 3 is surrounded by a photovoltaic cell 5 that is connected to the electronics of the meter and/or the control electronics present in the housing. The photovoltaic cell 5 is made annular. The display device 3 is consequently located in a circular recess 6 within the photovoltaic cell 5. The photovoltaic cell 5 and the display device 3 are located in one plane. Within the housing 2 is the electronics for the flow meter which is not shown.

On the housing 2 there is furthermore a transparent covering 7 in the form of a display glass. The transparent covering 7 is held by a cover ring 8 on the housing 2, the cover ring 8 being attached to the housing 2. The transparent covering 7 is located in one plane above the plane of the display device 3 and the photovoltaic cell 5.

FIG. 2 shows one exemplary embodiment of one part of the housing arrangement 1, specifically in particular a front part of a housing 2 with the display device 3 located on it. Underneath the display device 3 there are in turn operator buttons 4. On the housing 2 the photovoltaic cell 5 is held to be able to swivel on the housing 2 by means of a pivot bearing 9. The pivot bearing 9 which in this exemplary embodiment encompasses a ball which is supported within a receiver designed for this purpose enables a swiveling and turning of the photovoltaic cell 5 into a plurality of directions of space, especially also a swiveling of the photovoltaic cell 5 such that it is aligned backwards with reference to the display device 3.

FIG. 3 shows one exemplary embodiment of a part of a housing arrangement 1 with a part of a housing 2, the operator buttons 4 and the display device 3 being located on the housing 2. The illustrated part of a housing arrangement 1 can be inserted for example, into a housing 2 according to FIG. 1 on the front side. The photovoltaic cell 5 is mounted to be able to swivel around two axes so that the photovoltaic cell 5 can be swiveled with respect to the display device 3 into a plurality of tilt positions, as a result of which the photovoltaic cell 5 can be easily aligned with reference to one incidence direction. The two axes around which the photovoltaic cell is swiveled both run along one diameter of the circular photovoltaic cell 5. To produce the tilting or swiveling of the photovoltaic cell at least one servo is provided.

FIG. 4 shows an exemplary embodiment of part of a housing arrangement 1 in a cutaway side view. On part of housing 2, there is a display device 3 with operator buttons 4. The photovoltaic cell 5 is located on the housing 2 to be able to swivel around an axis that runs along a diameter of the photovoltaic cell 5. According to FIG. 4, the photovoltaic cell 5 is swiveled by an angle of roughly 30° C. with reference to the display device 3.

FIG. 5 shows one exemplary embodiment of a housing arrangement 1 with a housing 2, on the housing 2 there being a display device 3 and operator buttons 4. Above the display device 3 a cover ring 8 is held. The photovoltaic cell 5 is pivotally mounted with reference to the plane of its extension along the arrows which are shown in FIG. 5, the photovoltaic cell 5 being mounted to be able to swivel around additionally an axis so that the photovoltaic cell 5 can be aligned into a plurality of directions of space due to the pivoting and swiveling capacity. The photovoltaic cell 5 is swiveled according to FIG. 5, for example, like the swiveling of the photovoltaic cell 5 in FIG. 4, rotation being possible in addition.

FIG. 6 shows an exemplary embodiment of a housing arrangement 1 with a housing 2 on which there is a display device 3 with operator buttons 4. The display device 3 is covered by a transparent covering 7, the transparent covering 7 being held by a cover ring 8. Within the cover ring 8 is the photovoltaic cell 5. This configuration has the advantage that the photovoltaic cell 5 is located above the display device on the housing 2, as a result of which the photovoltaic cell 5 is not shadowed by parts of the housing 2. The housing arrangement 1 with the housing 2 can be attached to a flow meter (not shown).

FIGS. 7a & 7b show an exemplary embodiment of a housing arrangement 1 with a housing 2 on which there is a cover flap 10 which overlies the display device 3 which is not visible, in the closed state of the cover flap 10—see, FIG. 7a.

On the cover flap 10 is the photovoltaic cell 5. The cover flap 10 is attached to the housing 2 with a pivot bearing 9. The pivot bearing 9 encompasses a ball which is held to be able to swivel within a corresponding receiver.

The cover flap 10 with the photovoltaic cell 5 located on it consequently can be swiveled via the pivot bearing 9 in a plurality of directions of space so that the photovoltaic cell 5 can be easily aligned to incident radiation which is present at an installation site of the housing arrangement 1 with the flow meter.

The cover flap 10 is aligned manually, the pivot bearing 9 being made such that the opening state, especially the opening angle and the tilt, of the cover flap 10 can be fixed. The cover flap 10 consequently always remains in the position into which it has be manually re-set. FIG. 7b shows, for example, the cover flap 10 in the partially opened and slightly swiveled state.

What is claimed is:

1. A housing arrangement for a flow meter, comprising:
   at least one housing for flow metering electronics of the meter and
   at least one display device which is located on the housing for displaying values produced by the flow metering electronics,
   wherein at least one photovoltaic cell is mounted to the housing in at least a position in a manner configured and arranged surrounding the at least one display device,
   wherein at least the photovoltaic cell is mounted to be able to swivel around at least one axis relative to the display device and
   wherein the display device can be viewed through the photovoltaic cell in swiveled positions thereof.

2. The housing arrangement as claimed in claim 1, wherein the photovoltaic cell has a recess which corresponds at least to the size of the of the at least one display device.

3. The housing arrangement as claimed in claim 1, wherein the photovoltaic cell is annular.

4. The housing arrangement as claimed in claim 1, wherein the photovoltaic cell is mounted to be able to swivel around at least two axes.

5. The housing arrangement as claimed in claim 1, wherein the photovoltaic cell is pivotally mounted with reference to a plane of the photovoltaic cell.

6. The housing arrangement as claimed in claim 1, wherein the photovoltaic cell is mounted to be able to be moved by at least one servo.

7. The housing arrangement as claimed in claim 1, wherein the photovoltaic cell is integrated into the housing.

8. The housing arrangement as claimed in claim 7, wherein the photovoltaic cell is surrounded by the housing and located behind a transparent display glass of the at least one display device.

9. The housing arrangement as claimed in claim 1, wherein at least one cover ring is provided on the housing and wherein the photovoltaic cell is located in the cover ring.

10. The housing arrangement as claimed in claim 1, wherein said at least one photovoltaic cell has a first position located parallel to a plane in which the display is located and at least one second position pivoted out of the plane in which the display is located.

11. A flow meter, comprising:
    a housing arrangement having at least one housing for flow metering electronics of the meter,
    at least one display device which is located on the housing for displaying values produced by the flow metering electronics, and at least one photovoltaic cell mounted to the housing in a manner configured and arranged surrounding the display device for powering electronics of the meter, wherein at least the photovoltaic cell is mounted to be able to swivel around at least one axis relative to the display device and wherein displayed values are viewable through the photovoltaic cell in swiveled positions of the photovoltaic cell.

12. A flow meter according to claim 11, wherein the photovoltaic cell is surrounded by the housing and located behind transparent display glass of the at least one display.

\* \* \* \* \*